United States Patent
Mackman et al.

(10) Patent No.: US 9,625,897 B2
(45) Date of Patent: Apr. 18, 2017

(54) METHOD AND SYSTEM FOR TESTING A MACHINE TOOL

(71) Applicant: Delcam Limited, Birmingham, West Midlands (GB)

(72) Inventors: Stephen William Mackman, Birmingham (GB); William del Strother, Birmingham (GB); Steven Michael Hobbs, Birmingham (GB)

(73) Assignee: Delcam Limited, Birmingham, West Midlands (GB)

( * ) Notice: Subject to any disclaimer, the term of this patent is extended or adjusted under 35 U.S.C. 154(b) by 570 days.

(21) Appl. No.: 13/848,719

(22) Filed: Mar. 21, 2013

(65) Prior Publication Data
US 2013/0304247 A1 Nov. 14, 2013

(30) Foreign Application Priority Data

Mar. 21, 2012 (GB) .................................. 1204908.6

(51) Int. Cl.
*G05B 19/406* (2006.01)
*G05B 19/4093* (2006.01)

(52) U.S. Cl.
CPC ....... *G05B 19/406* (2013.01); *G05B 19/4093* (2013.01); *G05B 2219/36252* (2013.01);
(Continued)

(58) Field of Classification Search
CPC ........................................... G05B 2219/36252
(Continued)

(56) References Cited

U.S. PATENT DOCUMENTS 3,641,872 A   2/1972   Ulfhielm
4,079,235 A * 3/1978   Froyd .................. G05B 19/186
  318/571
(Continued)

FOREIGN PATENT DOCUMENTS

DE         19624131         12/1997
DE   102006058707 A1     6/2008
(Continued)

OTHER PUBLICATIONS

Tapie et al., "Circular tests for HSM machine: Bore machining application" International Journal of Machine Tools & Manufacture, vol. 47, Issue 5, Apr. 2007, pp. 805-819 pp. 805-819.*
(Continued)

*Primary Examiner* — Mohammad Ali
*Assistant Examiner* — Emilio J Saavedra
(74) *Attorney, Agent, or Firm* — Fish & Richardson P.C.

(57) ABSTRACT

A method to control a material remover can include generating a test path to be processed by the processing circuitry to cause the material remover of the machine tool to move along a predetermined path; causing the processing circuitry to execute the test path and move the material remover along the test path; timing at least one of the performance of the processing circuitry and the movement of the material remover along the test path to generate machine tool timings; and using the machine tool timings to set limits which are arranged to subsequently be used when cutting paths are generated for the machine tool for which the test path has been generated.

18 Claims, 12 Drawing Sheets

(52) U.S. Cl.
CPC ............ *G05B 2219/36253* (2013.01); *G05B 2219/36289* (2013.01); *G05B 2219/45145* (2013.01); *Y02P 90/265* (2015.11)

(58) Field of Classification Search
USPC ........................................................ 700/174
See application file for complete search history.

(56) References Cited

U.S. PATENT DOCUMENTS

| | | | |
|---|---|---|---|
| 4,445,182 | A | 4/1984 | Morita et al. |
| 4,533,286 | A | 8/1985 | Kishi et al. |
| 4,833,617 | A | 5/1989 | Wang |
| 4,949,270 | A | 8/1990 | Shima et al. |
| 5,251,144 | A | 10/1993 | Ramamurthi |
| 5,363,308 | A | 11/1994 | Guyder |
| 5,406,494 | A | 4/1995 | Schuett |
| 5,923,561 | A | 7/1999 | Higasayama et al. |
| 6,491,482 | B1 | 12/2002 | Fenkl et al. |
| 6,591,158 | B1 | 7/2003 | Bieterman et al. |
| 6,832,876 | B2 | 12/2004 | Hobbs |
| 7,933,679 | B1 | 4/2011 | Kulkarni et al. |
| 2001/0043842 | A1 | 11/2001 | Kaule et al. |
| 2002/0119020 | A1 | 8/2002 | Hobbs |
| 2003/0004605 | A1 | 1/2003 | Hamamura et al. |
| 2003/0110006 | A1* | 6/2003 | Nakamura ............ G05B 19/406 702/176 |
| 2007/0046677 | A1 | 3/2007 | Hong et al. |
| 2009/0102411 | A1 | 4/2009 | Miller et al. |
| 2009/0105883 | A1 | 4/2009 | Miller et al. |
| 2010/0204814 | A1 | 8/2010 | Neumaier et al. |

FOREIGN PATENT DOCUMENTS

| | | |
|---|---|---|
| EP | 1217482 A3 | 6/2002 |
| GB | 1402233 A | 8/1975 |
| GB | 1596135 A | 8/1981 |
| GB | 2111249 | 6/1983 |
| GB | 2207776 | 2/1989 |
| GB | 2355316 | 4/2001 |
| GB | 2363208 | 12/2001 |
| JP | 60-56811 | 4/1985 |
| WO | 9905501 A1 | 2/1999 |

OTHER PUBLICATIONS

Msaddek et al., "Modeling and simulation of high-speed milling centers dynamics" International Journal of Advanced Manufacturing Technology, Apr. 2011, vol. 53, Issue 9-12, pp. 877-888.*

Ruiz et al., "A Real-Time Tool Positioning Sensor for Machine-Tools" Sensors 2009, vol. 9 Issue 10, pp. 7622-7647.*

Fortgang et al., "Command Shaping for Micro-Mills and CNC Controllers" 2005 American Control Conference Jun. 8-10, pp. 4531-4536.*

Loin Precision, "Knowing your machine tool's capabilities: lean and beyond" Today's Medical Developments, Jun. 2011.*

UK Patents Act 1977: Search Report under Section 17(6) of corresponding foreign application No. GB1204908.6 dated Nov. 8, 2012; total 3 pages.

UK Patents Act 1977: Search Report under Section 17(5) of corresponding foreign application No. GB1204908.6 dated Aug. 1, 2012; total 5 pages.

* cited by examiner

R: tool radius (mm)
N: spindle speed (rpm)
F: feedrate (mm/min)
s: stepover (mm)
a: engagement angle (°)

METHOD AND SYSTEM FOR TESTING A MACHINE TOOL

FIELD OF THE INVENTION

Embodiments of the invention relate to testing a machine tool and/or to generating a cutting path for a machine tool. In particular, but not exclusively, embodiments of the invention relate to timing a machine tool to ascertain a number of operating limits for the machine tool. Some embodiments of the invention may subsequently use the limits generated from the testing to create cutting paths, which are typically optimised cutting paths, for the machine tool on which the testing has been performed.

BACKGROUND OF THE INVENTION

Computer Numerically Controlled (CNC) machines are well know. Such CNC machines typically control a material remover and include milling machines having various numbers of axes about which the material remover can be moved. In such milling machines, the material remover is a rotating element that is moved across the block of material from which a part is being manufactured.

As such, the CNC machine has, what may be referred to as, a cutting path programmed into it along which the material remover is moved. It will be appreciated that the length of time that it takes to make a part from the block of material is governed by the length of the path and the speed at which the material remover is moved along that path. Thus, the more efficiently the path can be planned then the quicker the part can be manufactured.

It will also be appreciated that the machine controlling the material remover will have physical constraints upon its movement. For example, the motors controlling motion of the material remover will only be able to apply a finite amount of force and torque; the material remover will be able to remove a maximum amount of material in a pass, etc. Processing circuitry of the machine tool that processes the cutting paths and/or controls motion of the material remover will also have a maximum rate at which it can process instructions and this maximum rate, as with the physical constraints, will vary between machine tools.

Therefore, it is possible for a desired cutting path (ie one that a program wishes the material remover to follow) to request that the material remover exceed either or both of the physical constraints or the processing constraints which will typically lead to the cutting not being performed as desired. If the constraints are exceeded the machine will typically execute a compromise which may be due to physical limitation (for example the acceleration of the material remover will simply be limited to what is possible to achieve) or software causing the material remover to move may adapt the cutting path to something that is achievable.

As such, providing a cutting path that the material remover cannot execute as intended can affect the speed at which the part can be made but it can also affect the quality of the finished part since the compromises that are employed can lead to unexpected results.

FIGS. 1a and 1b show details of a material remover 204 with various parameters marked thereon which are useful in explaining the process of linear milling as would be performed by a machine tool such as a CNC milling machine as shown in FIG. 2.

The cutting conditions of the material remover 204 are mostly affected by the spindle speed N, the feedrate F and the amount of material the tool is removing which is defined by the depth of cut d and the stepover s. It will be seen that stepover s is measured in a radial direction of the cutting tool whereas the depth of cut is measured in an axial direction of the cutting tool.

It is common practice to adapt these values depending on the properties of a block of material 202 being machined (nature of the material, its hardness, etc.) but also depending on the properties of the material remover 204 (tool size and shape, material it is made of, number of teeth, etc.). Tool manufacturers (ie manufacturers of the material remover 204) typically provide charts detailing the maximum safe parameter values that can be used for a specific material remover 204 when cutting a block of material 202 of a given type.

Embodiments can achieve efficient machining of a particular part by setting these values so as to remove as much material as possible in the least possible amount of time. Common sense dictates that this equates to finding a combination of the parameters outlined in relation to FIG. 1a (F, N, s and d) such that the material remover 204 is cutting as close as possible to its capabilities.

SUMMARY OF THE INVENTION

According to a first aspect of the invention there is provided a method of testing a machine tool comprising processing circuitry arranged to control a material remover, in which the method may comprise at least one of the following:

a) generating a test path to be processed by the processing circuitry to cause the material remover of the machine tool to move along a predetermined path;

b) causing the processing circuitry to execute the test path and move the material remover along the test path and timing at least one of the performance of the processing circuitry and the movement of the material remover along the test path to generate machine tool timings; and c) using the machine tool timings to set limits which are arranged to subsequently be used when cutting paths are generated for the machine tool for which the test path has been generated.

Embodiments providing such a method are believed advantageous because it allows machine tool timings to be generated for a specific machine tool which can then be used to generate a cutting path tailored to that machine tool. Such tailored cutting paths are perhaps more likely to allow a part to be fabricated at the desired speed and/or quality.

Moreover, it is noted that as a machine tool ages then its parts wear and as such, its physical characteristics can change. Accordingly, a further advantage of at least some embodiments is that they may be re-run, from time to time, and provide machine tool timings which take into account the changing physical characteristics.

Generally, the method will cause the material remover to execute the test path with no work-piece present. Such embodiments are believed advantageous in that they test properties of the machine tool per se rather than properties of the machine tool modified by the material being worked upon.

Embodiments may cause the material remover to execute a closed test path which is convenient since it returns the material remover to its starting position and may allow a plurality of such closed test paths to be executed. Executing a plurality of test paths may make the machine tool timings more accurate as the timings may be averaged over more than one closed test path.

In other embodiments, the test path may be open, or at least 'almost closed'. Such a path may be provided by a shape such as a trochoid or the like.

In one embodiment, the method may cause the material remover to execute at least one circle where the circle provides the closed test path. Typically, the method will cause the material remover to execute a plurality of circles. Embodiments using circles are believed advantageous since a circle is mathematically simple to handle and therefore generation of instructions to cause the material remover to execute the test path may require less processing than other shapes of closed test path.

In alternative embodiments, the closed path may be provided by an ellipse, or the like.

Generally, embodiments of the method will cause the material remover to execute, in a first part of the test, a single closed test path having a parameter of a first value, typically a circle of a first radius, and latterly to execute, in a second part of the test, a plurality of closed test paths having the parameter set at that first value. Such an arrangement is convenient since it allows the acceleration, etc. required to accelerate the material remover to speed (and determined from the single circle) to be removed from the steady state (determined from running the material remover over a plurality of circles).

Conveniently, the parameter varied by embodiments is the radius of at least a portion of the test path. When the closed test path is a circle then it is convenient when the parameter is the radius of the circle.

The method may cause the material remover to perform at least one of the first and second parts of the test a plurality of times with a parameter of the test path being performed being varied between executions. Typically, the material remover may be arranged to perform the tests with the parameter set at a value, such as a first radius, and to subsequently to change that parameter. Conveniently, the parameter is a radius which is reduced between tests.

In some embodiments, the method may set the radius of a circle of the test path to a first value and time the performance of the material remover. In subsequent tests, the radius of the circle of the test path may be reduced from the first value. In one particular embodiment, the radius of the circle is halved in subsequent tests.

Conveniently, embodiments select a starting, or initial radius, of the circle (or other first parameter) such that the machine tool cannot achieve a desired feed rate whilst performing the test path or at least the test path is close to the machine tools limit. Typically, the machine tool will fail to provide sufficient acceleration before it fails to provide sufficient jerk. As such, it is advantageous to perform the test path whilst the machine tool is failing to execute the test path correctly (ie the input feed rate does not match the output feed rate) in order that sufficient machine tool timings can be obtained to determine each of the desired limits.

Some embodiments may vary the parameter, such as decreasing the radius, until a predetermined value is met.

Other embodiments may vary the parameter until sufficient machine tool timings have been obtained to ascertain each of the limits that are being calculated. Accordingly, in some tests it is the jerk limit that requires more machine tool timings to determine and the test may continue until sufficient machine tool timings have been obtained to calculate the jerk limit.

For each different radius used the feed rate achieved by the machine tool may be calculated. Indeed, other limits, such as any of the following: the acceleration limit, the jerk limit, the minimum radius, or the like may also be obtained for each different radius (or other parameter).

Typically, the test path is planar; ie it describes a path within a plane. In other embodiments, a non-planar test path may be provided.

Conveniently, the method may align the test path with a principal plane of the machine tool. For example, in an XYZ co-ordinate frame, the text may cause the test path to lie in one of the planes XY; YZ; or ZX. Such an embodiment is believed advantageous since it causes the material remover to move in only two axes at any one time and thereby constrains parts of the machine tool which are being tested. It will be appreciated that different axes of the machine may have different limits and it is convenient to determine these limits separately.

Embodiments, may typically be arranged to execute a test path in each of the principle planes of the machine tool. For example, in an XYZ co-ordinate frame the method will typically perform test to test each of the XY; YZ and ZX planes. As such, these embodiments may be arranged to perform three test paths with each test path lying in, or at least substantially in, one of the principal planes.

In alternative embodiments, the test path may be inclined to the principle planes thereby causing the material remover to require 3 axes of the machine tool moving at any one time to perform the test path. Such an embodiment may be used to verify measurements taken within a principle plane still hold when the material remover moves out of the principle plane.

The method may run the test path a plurality of times such that it is aligned with a different principal plane of the machine tool in each iteration.

In alternative, or additional, embodiments the method may cause the material remover to move along a test path, which may be referred to as a rate of processing test path, such that the machine tool timings so generated may be used to determine the maximum rate at which the processing circuitry can process points that define the test path. Such a rate of processing test path may be of the form discussed elsewhere, including closed path, circular, elliptical, or the like.

The method may set the feed rate of the rate of processing test path such that points defining the rate of processing test path are expected to be above that which the processing circuitry of the machine tool may process. Once the test path executed, or at least partially executed, the method may determine, from the machine tool timings, the rate of processing that the processing circuitry performed.

Conveniently, embodiments of the method may use the processing circuitry of the machine tool to time the movement of the material remover. Such embodiments are convenient in that they do not require additional hardware. Other embodiments may be arranged to query limits used in step c from the processing circuitry of the machine tool although limits obtained from the processing circuitry in this manner may not be as accurate as desired. Moreover, not all machine tools can be queried in this manner.

The method may be arranged to determine at least one of the following limits: the maximum rate at which the processing circuitry of the machine can process points; the maximum jerk (ie rate of change of acceleration) that the machine tool can apply; the maximum acceleration that the machine tool can apply; the minimum rate at which the machine tool can process points to allow the machine tool to process a test path having a predefined tolerance; the minimum radius that the material remover can be moved around; and the like.

Some embodiments of the method may allow a user to alter the limits set from the machine tool timings, typically to make them more conservative. For example, the method may allow a user to specify a maximum and/or minimum value for anyone of the limits determined by the method. For example, a user may be able to set a maximum limit for the jerk which can be convenient since the user may know, perhaps from personal experience, that, whilst a machine can theoretically handle a jerk (or other limit) above a value, taking the machine above that value can lead to unpredictable, unstable, etc. behaviour.

In alternative, or additional embodiments, the method may allow a test to be aborted, typically by a user, should the machine tool performing the test behave in what is deemed a problematic manner. Problematic may for example be that the machine starts to vibrate too greatly, make excessive noise, or the like. Should the test be aborted then any machine tool timings generated to-date may be used to set the limits which are subsequently used thereby avoiding problematic behaviour.

According to a second aspect of the invention there is provided a machine tool comprising a processing circuitry which is arranged to be programmed and a material remover arranged to be controlled by the processing circuitry, wherein the processing circuitry is arranged to perform at least one of the following:
  a) receive a test path arranged to cause the material remover of the machine tool to move along a predetermined path;
  b) execute the test path and move the material remover along the test path and to time at least one of the performance of the processing circuitry and the movement of the material remover along the test path to generate machine tool timings; and
  c) use the machine tool timings to set limits which are subsequently used when cutting paths are generated for the machine tool for which the test path has been generated.

In some embodiments the machine tool may be arranged to generate a test path. However, the machine tool may also be arranged to receive a test path from a remote source such as a CAM (Computer Aided Manufacturing) package, or the like.

The processing circuitry will typically comprise a controller arranged to process the test path and cause the material remover to perform the test path.

The processing circuitry may be arranged to provide a timer arranged to time the material remover. The timer may be a software function executed by the processing circuitry, a hardware element of the processing circuitry or a combination of both software/firmware and hardware.

According to a third aspect of the invention there is provided a machine readable medium providing instructions, which when read by a machine cause that machine to provide the method of the first aspect of the invention or perform as the machine tool of the second aspect of the invention.

According to a fourth aspect of the invention there is provided a machine readable medium containing instructions to cause a processing circuitry to generate a test path for a material remover arranged to be controlled by a further processing circuitry of a machine tool, wherein the processing circuitry is arranged to perform at least one of:
  a) generate a test path arranged to cause the material remover of the machine tool to move along a predetermined path;
  b) wherein the test path is arranged to cause the further processing circuitry to move a material remover along the test path and to time at least one of the performance of the processing circuitry and the movement of the material remover along the test path to generate machine tool timings; and
  c) use the machine tool timings to set limits which are subsequently used when cutting paths are generated for the machine tool for which the test path has been generated.

According to a fifth aspect of the invention there is provided a method of generating a cutting path for a material remover of a machine tool, the machine tool comprising processing circuitry arranged to control a material remover of the machine tool and the method comprising:
  a) generating a test path to be processed by the processing circuitry to cause the material remover of the machine tool to move along a predetermined path;
  b) causing the processing circuitry to execute the test path and move the material remover along the test path and to time at least one of the performance of the processing circuitry and the movement of the material remover along the test path to generate machine tool timings;
  c) using the machine tool timings to set limits which are subsequently used when cutting paths are generated for the machine tool for which the test path has been generated; and
  d) generating a cutting path.

Thus, since generation of the cutting path relies upon limits that have been determined specifically for a given machine the cutting path should produce a part which is either quicker to produce or of better quality. In this regard, the skilled person will appreciate that using a cutting path with sub-optimal limits can cause the material remover to move more slowly than desired or can affect the quality of the part being machined. Thus, using optimised limits can address one or both of these properties.

According to a sixth aspect of the invention there is provided a machine tool comprising a processing circuitry which is arranged to be programmed and a material remover arranged to be controlled by the processing circuitry, wherein the processing circuitry is arranged to perform at least one of the following:
  a) generate a test path to cause the material remover of the machine tool to move along a predetermined path;
  b) execute the test path and move the material remover along the test path and time at least one of the performance of the processing circuitry and the movement of the material remover along the test path to generate machine tool timings;
  c) use the machine tool timings to set limits which are subsequently used when cutting paths are generated for the machine tool for which the test path has been generated; and
  d) generate a cutting path.

According to a seventh aspect of the invention there is provided a machine readable medium containing instructions which when read by a machine cause that machine to perform the method of the fourth aspect of the invention or to perform as the machine tool of the fifth aspect of the invention.

According to an eighth aspect of the invention there is provided a method of generating a cutting path for a material remover of a machine tool, the machine tool comprising processing circuitry arranged to control a material remover of the machine tool and the method comprising using limits, which are specific for that machine tool, to generate the cutting path.

The limits may be as generated by any of the above aspects of the invention or may be queried from the machine tool. Indeed, in some embodiments the limits may be obtained by a combination of obtaining them from the methods of the above aspects of the invention and querying them from the machine.

In particular embodiments may use the limits to determine the minimum radius of curvature that can be used in the cutting path. In particular the method may utilise at least one of the acceleration and jerk limits to determine the minimum cutting radius.

In one embodiment, the method utilises, to obtain the minimum cutting radius, the greater value for that radius determined from using the limit of acceleration and the limit of jerk.

The method may also ensure that the point spacing used on the cutting path is above any minimum point spacing that has been determined and/or below any maximum point spacing that has been determined.

The cutting path may be generated by methods outlined in GB1121277.6 by the current applicant. The contents of GB 1121277.6 are hereby incorporated by reference and the skilled person is directed to read this document.

According to a ninth aspect of the invention there is provided a machine readable medium containing instructions which when read by a machine cause that machine to perform the method of the eighth aspect of the invention.

According to a tenth aspect of the invention there is provided an apparatus arranged to perform the method of the eighth aspect of the invention.

The machine readable medium of any of the aspects of the invention may comprise any one or more of the following: a floppy disk, a CDROM, a DVD ROM/RAM (including +RW, −RW), an HD DVD, a BLU Ray disc, a hard drive, a non-volatile memory, any form of magneto optical disk, a wire, a transmitted signal (which may comprise an internet download, an ftp transfer, or the like), or any other form of computer readable medium.

The skilled person will appreciate that a feature described in relation to any one of the above aspects of the invention may be applied, mutatis mutandis, to any other aspects of the invention.

BRIEF DESCRIPTION OF THE DRAWINGS

There now follows by way of example only a description of embodiments of the present invention of which:

FIG. 12a shows a plan view of a test path;

FIG. 12b shows a plot of accelerations experienced by a material remover of a machine tool when executing the path of FIG. 12a;

FIG. 13 shows a plot of timing data collected from a data capture device executing a test path similar to that shown in FIG. 12a;

FIG. 14a shows a further example plan view of a test path;

FIG. 14b shows a plot of accelerations experienced by a material remover of a machine tool when executing the path of FIG. 14a;

FIG. 15 shows a plot of timing data collected from a data capture device executing a test path similar to that shown in FIG. 14a;

DETAILED DESCRIPTION OF THE DRAWINGS

Figure 3:
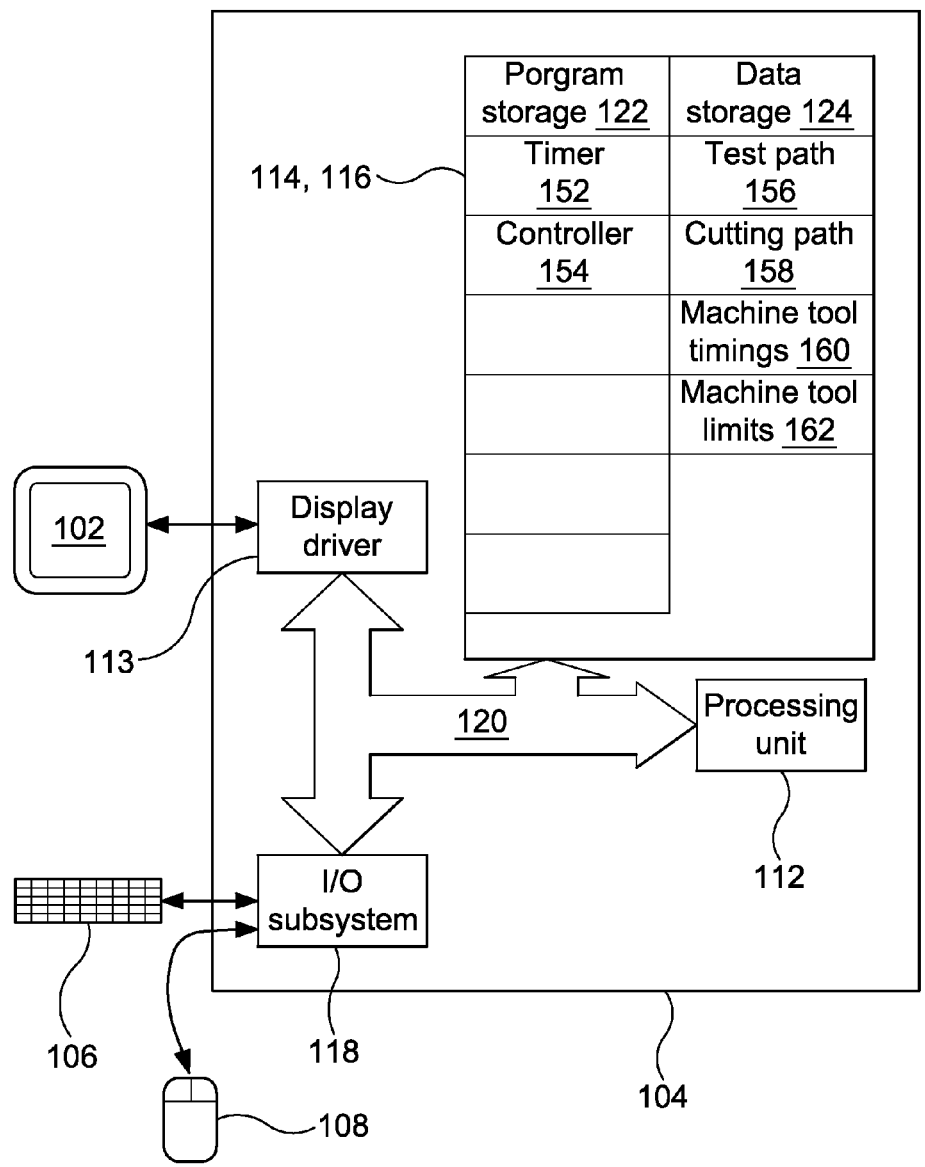
FIG. 3 schematically shows the memory of a processing unit arranged to provide an embodiment.

The computer system of FIG. 3 comprises a display 102, processing circuitry 104, a keyboard 106 and a mouse 108. The processing circuitry 104 comprises a processing unit 112, a graphics system 113 (which may be thought of as a display driver), a hard drive 114, a memory 116, an I/O subsystem 118 and a system bus 120. The processing unit 112, graphics system 113 hard drive 114, memory 116 and I/O subsystem 118 communicate with each other via the system bus 120, which in this embodiment is a PCI bus, in a manner well known in the art.

The graphics system 113 comprises a dedicated graphics processor arranged to perform some of the processing of the data that it is desired to display on the display 102. Such graphics systems 113 are well known and increase the performance of the computer system by removing some of the processing required to generate a display from the processing unit 112.

It will be appreciated that although reference is made to a memory 116 it is possible that the memory could be provided by a variety of devices. For example, the memory may be provided by a cache memory, a RAM memory, a local mass storage device such as the hard disk 114, any of these connected to the processing circuitry 104 over a network connection. However, the processing unit 112 can access the memory via the system bus 120 to access program code to instruct it what steps to perform and also to access data to be processed. The processing unit 112 is arranged to process the data as outlined by the program code.

A schematic diagram of the memory 114,116 of the computer system is shown in FIG. 3. It can be seen that the memory comprises a program storage portion 122 dedicated to program storage and a data storage portion 124 dedicated to holding data.

The program storage portion 122 comprises a timer 152 arranged to time movement of the material remover 204 and a controller 154 arranged to control movement of the material remover from a test path and/or cutting path.

The data storage of the memory 114, 116 comprises a test path 156 arranged to be processed by the processing circuitry to perform the tests as described below. The data storage portion 124 is also arranged to store machine tool timings 160 as the test are performed such that once the tests outlined below have been performed a set of machine tool timings are stored. The data storage portions is also arranged to contain limits 162 (which may be thought of as parameters) which are derived from the machine tool timings. In embodiments which are arranged to perform execute cutting paths which have been generated from the machine tool timings 160 then the data storage portion 124 is also arranged to store that cutting path 158.

Figure 2:
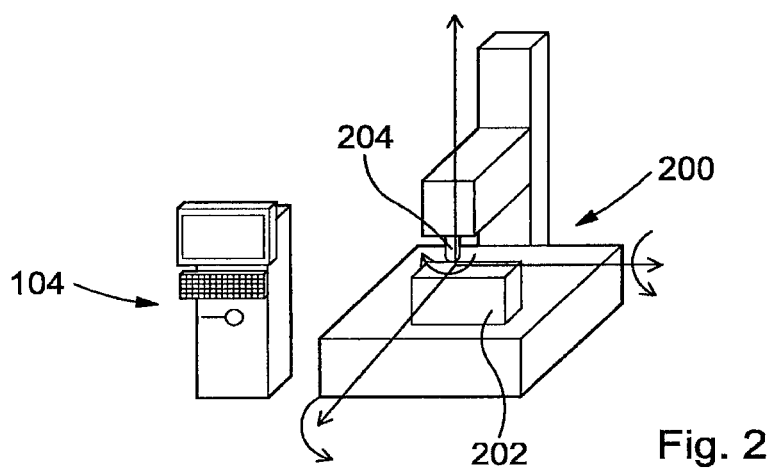
FIG. 2 shows a machine tool suitable for use in an embodiment.

In one embodiment, there is provided a CNC milling machine 200 as shown in FIG. 2 which can be used to fabricate, by executing a cutting path, a part from a block of material 202, which may be thought of as a work-piece. A material remover 204 removes material from the block 202 and is controlled by processing circuitry 104. In other embodiments, the CNC milling machine 200 may be controlled by a separate processing circuitry, which may be referred to as a further processing circuitry, which receives data from the processing circuitry 104.

In some embodiments, the processing circuitry 104 may be arranged to query the machine tool in order to obtain limits of the machine tool therefrom. These limits may subsequently be used to generate cutting paths for that machine tool 200 and the limits may be any of those described herein. As such, the processing circuitry 104 may communicate with a further processing circuitry within the machine tool to obtain the limits which are subsequently used to generate a cutting path specific to that particular machine tool.

In yet further embodiments, the machine may be a machine other than a milling machine.

Figure 1A:
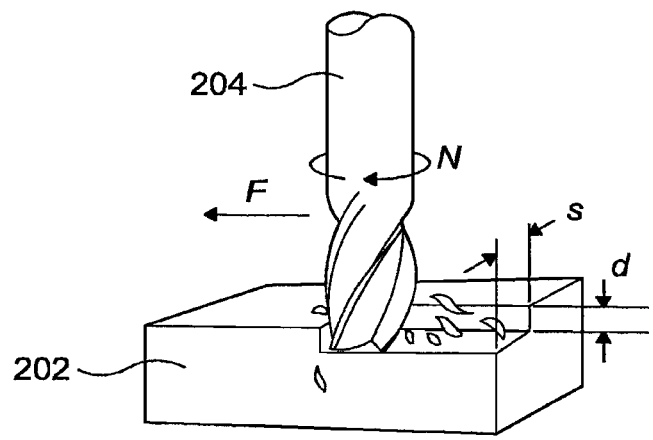
FIGS. 1a and 1b (Prior Art) schematically show various parameters which can be used to detail a material remover of a machine tool and its interaction with material from which the material remover is removing material.
Figure 1B:
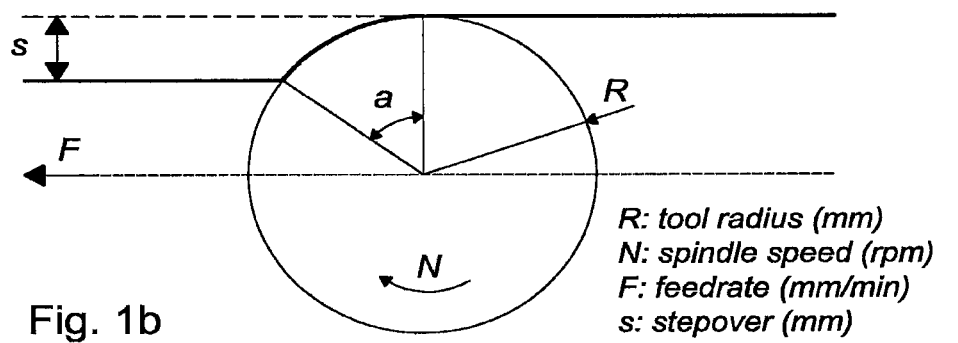

Returning to FIGS. 1 and 2, it will be seen that, in the embodiment being described, the material remover 204 is driven by a CNC milling machine 200 which is in turn controlled by the processing circuitry 104. It is known that the machine 200 will have limits to the speed and acceleration at which the material remover 204 can be moved together with limits at which the processing circuitry 104 can process instructions.

Thus, returning to FIG. 1, it will be seen that there are a number of parameters N (rotary velocity), s (stepover), d (depth of cut) and F (feed rate) that can be specified. For a given material/material remover 204 combination the maximums for these parameters are often set by the manufacturer of the material remover 204.

Figure 4:
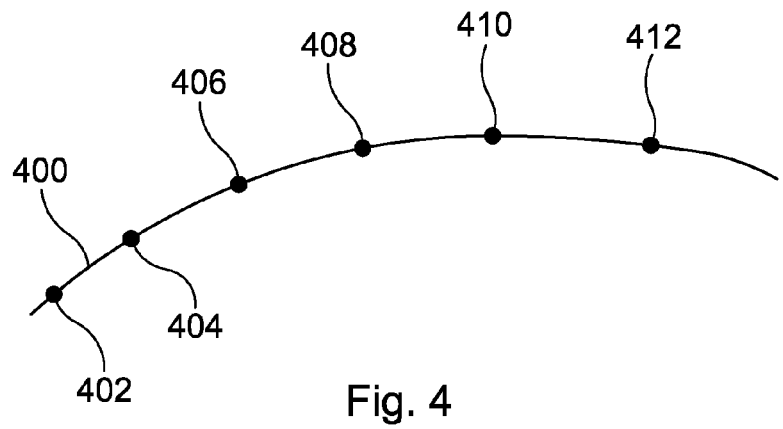
FIG. 4 shows a portion of a typical cutting path.

FIG. 4 highlights that a cutting path 400 can be specified by a plurality of points 402, 404, 406, 408, 410, 412. To cut a part from the block of material 202 then the processing circuitry 104 controls the material remover 204 to move from point to point 402-412. A path between the points 402-412 may also be specified which may be a curved path in order to replicate the desired cutting path 400 as closely as possible.

It will be appreciated that the point spacing (ie distance between points 402-412) can be varied but the rate at which the processing circuitry 104 can handle points is governed by the capability of the processing circuitry 104 and as such, there is a balance between the density of the points and the maximum feed rate F that can be maintained; if the cutting path specifies points that are closely spaced then the machine may be unable to maintain the programmed feed rate because it is unable to process the points fast enough. Thus, for example if the processing circuitry can process 100 points per second, it could follow a 1 m straight path at 1 m/S provided the points are no closer than 10 mm apart. If the point spacing was 1 mm, the point processing time would limit maximum speed to 0.1 m/S.

Accordingly, embodiments may provide a test path that can be executed and which have an initial number of points 402-412 therealong. Subsequently, the number of points may be increased and the test path re-run. This exercise may be increased until the material remover starts to slow, the inference being that a processing limit within the processing circuitry has been reached.

However, in the embodiment being described, a test path is provided that is likely to exceed the rate at which the processing circuitry 104 can handle points. As with other tests, the material remover 204 is timed as it performs the test path to generate machine tool timings which are subsequently used to determine the rate at which the processing circuitry 104 was able to process the points. Typically, this test path is a curve specified by a large number of points, where large is intended to mean beyond the processing capability of the processing circuitry.

However, it is also possible that the points can be too widely spaced, particularly when a cutting path causes the material remover 204 to move around a curve. For example, a smoothly curved path described by points (i.e. a polyline) requires an infinite acceleration at each point where the path direction changes. If the points are too widely spaced, the processing circuitry may determine that the material remover 204 cannot follow the cutting path smoothly and instead cause the material remover to stop at each point. Accordingly, should the cutting path contain points that are more closely spaced this may enable the processing circuitry to recognise that the path is sufficiently smooth to follow at the desired feed rate F. As an example, a small radius circular path may be defined within tolerance by just 4 points but a path described in this manner looks like a square to the processing circuitry and the processing circuitry may therefore cause the material remover to stop at each point/corner. In this example, increasing the number of points to 40, for example, may mean that the processing circuitry will recognise that the path is a smooth curve and run continuously.

Accordingly, some embodiments may be arranged to determine the maximum rate at which the processing circuitry can process points; ie an upper limit for the processing performance of the processing circuitry 104. Some embodiments may be arranged to determine the minimum number of points needed to represent a curved line; ie a lower limit for the processing performance of the processing circuitry 104.

Embodiments cause the machine to run a test program which moves the material remover 204 through a series of tests. In one embodiment, these tests allow at least some of the following parameters to be determined:
1. For a given programmed feedrate what is the minimum radius of arc that the machine can move in and still move at the programmed feedrate;
2. What is the minimum time per point that the machine tool can process;
3. What is the maximum point separation for a path to be treated as a continuous curve;
4. What is the maximum acceleration that the machine can achieve; and
5. What is the maximum jerk (ie change in acceleration—$m/s^3$) that the machine 200 can achieve.

In particular, the tests cause the machine 200 to cause the material remover 204 to make a predetermined test path and this is arranged to be performed with no material 202 present; ie no work piece. As such, the material remover 204 makes a series of moves to perform the test path with minimal resistance (since there is no material 202 present).

The actual movements of the material remover 204 are timed and from this a determination is made of the maximum limits of the machine 200. In particular the processing circuitry of the machine tool is used to perform the timing of the material remover thereby removing the need for additional hardware to perform the tests.

In some embodiments, the test may start off with movements which the machine 200/material remover 204 should easily be able to perform and subsequently increase the demands placed upon the machine 200/material remover 204. In this manner it should be possible to determine when the material remover 204 fails to perform the move that has been requested and as such the maximum value for that movement has been determined (ie the last move that was successfully completed).

In particular, some embodiments may be arranged to determine the minimum cutting radius. In particular, it is convenient if the material remover 204 can be caused to move at a substantially constant feed rate when executing a cutting path. However, if the machine 200 is asked to move the material remover 204 around an arc with a radius less than an amount set by the machine then the maximum feed rate will reduce. As such, some embodiments may utilise the determined minimum radius when planning cutting paths to help ensure that cutting paths can be planned which do not cause the feed rate to decrease; ie they ensure that the radii of turns are above a predetermined minimum radius (which may be determined by the tests discussed here). It is useful to note that it can be advantageous to use cutting paths with smaller cutting radii since this would tend to result in shorter cutting paths but there is a compromise and a radius under the minimum cutting radius should not be used.

Looking at the list of five tests above then some embodiments may determine the result of test 1 (minimum cutting radii) from tests 4 (max. acceleration) and 5 (maximum jerk). Such derivation of the minimum cutting radius is typically possible for machines which have clear acceleration limits. Other machines 200 do not have precise limits and as such, it is generally harder to derive the results for test 1 and in such machines it may therefore be necessary to directly measure, by timing as described elsewhere, the minimum achievable cutting radii.

Once the tests have been performed then the processing apparatus 104 that controls the machine 200 generates a file containing parameters (ie limits set from the machine tool timings) which have been determined by the tests. In other embodiments the parameters may be captured by other means. For example the parameters could be displayed on a screen, etc.

Figure 5:
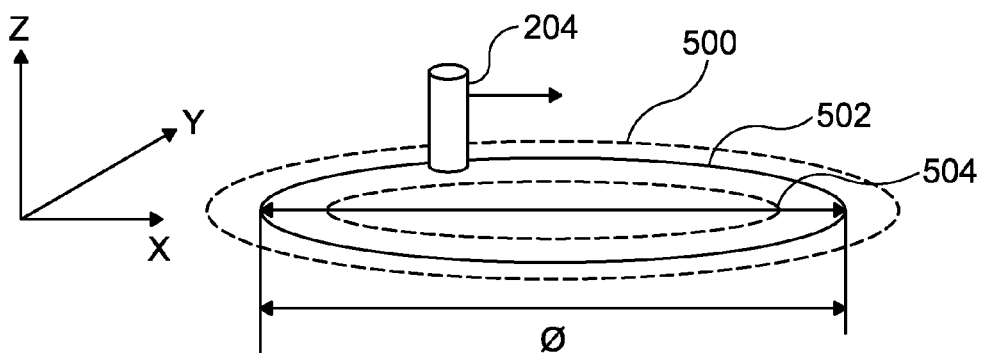
FIG. 5 shows a series of test cutting paths used by an embodiment.

Turning to one particular embodiment, then a series of test paths is shown in FIG. 5. In this embodiment, the processing circuitry 104 causes the machine tool 200 to drive the material remover 204 around a series of circular test paths 500, 502, 504. These circular test paths may be thought of as being closed test paths and shapes other than circular are possible. Thus, a test path, which may be thought of as an overall test path, may comprise a plurality of closed test paths. As such, it will be appreciated that the processing circuitry 104 specifies that the material remover 204 move at a predetermined speed, which, according to the radius of the circle of the test path results in calculable acceleration (toward the centre of the circle) and jerk (ie change in acceleration). The skilled person will appreciate that acceleration is a vector property and, since the direction of the acceleration is constantly changing as the material remover 204 moves around the cutting path, that there is a constant change in acceleration providing the jerk.

The test paths in FIG. 5 are arranged to lie within the XY principle plane of the machine tool 200 such that the capabilities of the machine tool are tested with the material remover 204 moving in this plane. The embodiment being described performs the test in each of the principal planes such that the test are performed with the test paths 500-504 lying in each of the XY; YZ; and XZ planes.

As such, the predetermined speed at which the processing circuitry asks the material remover 204 to move may be thought of as an input feed rate, where feed rate is a term of art meaning speed. The speed/feed rate that the material remover 204 can actually manage is the output feed rate. As such, and as represented in FIG. 6, it is often the case that the machine tool 200 will be able to drive the material remover 204 at the requested input feed rate up to a certain point (ie the output feed rate is equal to the input feed rate) and this is represented by the point X on FIG. 6.

Beyond point X, as the input feed rate requested of the machine tool 200/material remover 204 increases further the machine tool can no longer deliver an output feed rate which is equal to the input feed rate. What happens beyond point X is determined by the machine tool 200; different models and/or machines from different manufactures react differently.

Figure 6:
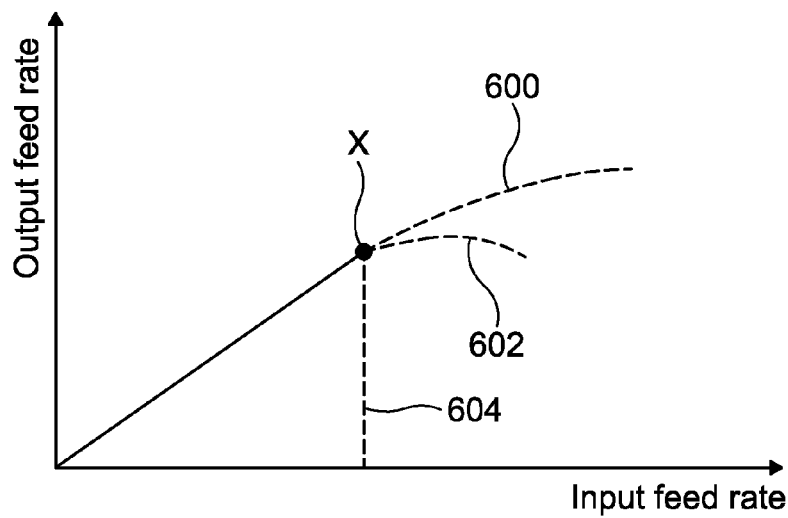
FIG. 6 shows a graph of input feed rate vs output feed rate.

As illustrated in FIG. 6, the achievable output feed rate may continue to rise, just not with the input feed rate that has been requested (line 600). Alternatively, the output feed rate may actually tail off (line 602). In a worst case scenario the machine tool 200 may simply stop (line 604). It will be appreciated that the lines of FIG. 6 are intended to be illustrative only and are not intended to provide quantitative data.

Returning to FIG. 5, it will be appreciated that as the radius of the circle is decreased and/or the input feed rate is increased then the cutting path requires a higher acceleration and jerk from the machine tool 200 and it is less likely that the output feed rate can match the input feed rate.

As such, in the embodiment being described, and as illustrated with reference to FIG. 10, the machine tool is arranged to move the material remover around a larger radius circle (eg 500). In particular, two runs are performed. A first run, in a first part of the test, times the material remover to make a single revolution of the circle 500 step (1000). This first run will include the time that it takes to get the material remover up to speed and as such is not representative of the time that it would take the material remover to move around the same circle from a moving start.

Accordingly, the second run, in a second part of the test, times the material remover to make 11 revolutions of the circle (step 1002). The skilled person will appreciate that in other embodiments other number of revolutions may be appropriate and may be determined by the accuracy that the machine tool can time the movement of the material remover.

Then, in order to determine the typical time to make a single revolution the time taken to make the single revolution from the first run is subtracted from the time to make eleven runs to give the time for ten runs at constant feed rate. Then, the remaining time is divided by ten to give the time for a single revolution at a constant feed rate. It can then be determined whether the measured time for a single revolution matches that requested by the input feed rate.

In some embodiments further tests are run in which the input feed rate is incremented. This test is repeated for the circle 500 until the output feed rate measured by the test no longer matches the requested input feed rate (ie it is known that the point X of FIG. 6 has been reached): step 1004.

However, in the embodiment being described, the input feed rate is maintained at a constant and the test is re-run with test paths of a different radius as described below and as illustrated by the circles 502, 504 of FIG. 5. The feed rate selected for the test is one that is within the capabilities of the machine tool being tested. In one embodiment being tested the selected feed rate was 3000 mm/min.

It will be appreciated that embodiments typically perform the tests described herein without a work-piece 202 being present. As such, the set-up time for each test is relatively quick since there is no need to replace a work-piece. Moreover, the test paths tend to be small and as such do not take long to execute.

In one particular embodiment the starting, or initial, radius of the circular cutting path 500 is set to be 16 mm. However, the skilled person will appreciate that other radii may be equally suitable. For example, other embodiments may use substantially any of the following radius 50 mm; 45 mm; 40 mm; 35 mm; 30 mm; 25 mm; 20 mm; 15 mm; 10 mm; 5 mm; 2.5 mm; 1 mm; 0.5 mm or any radius in between these.

Figure 10:
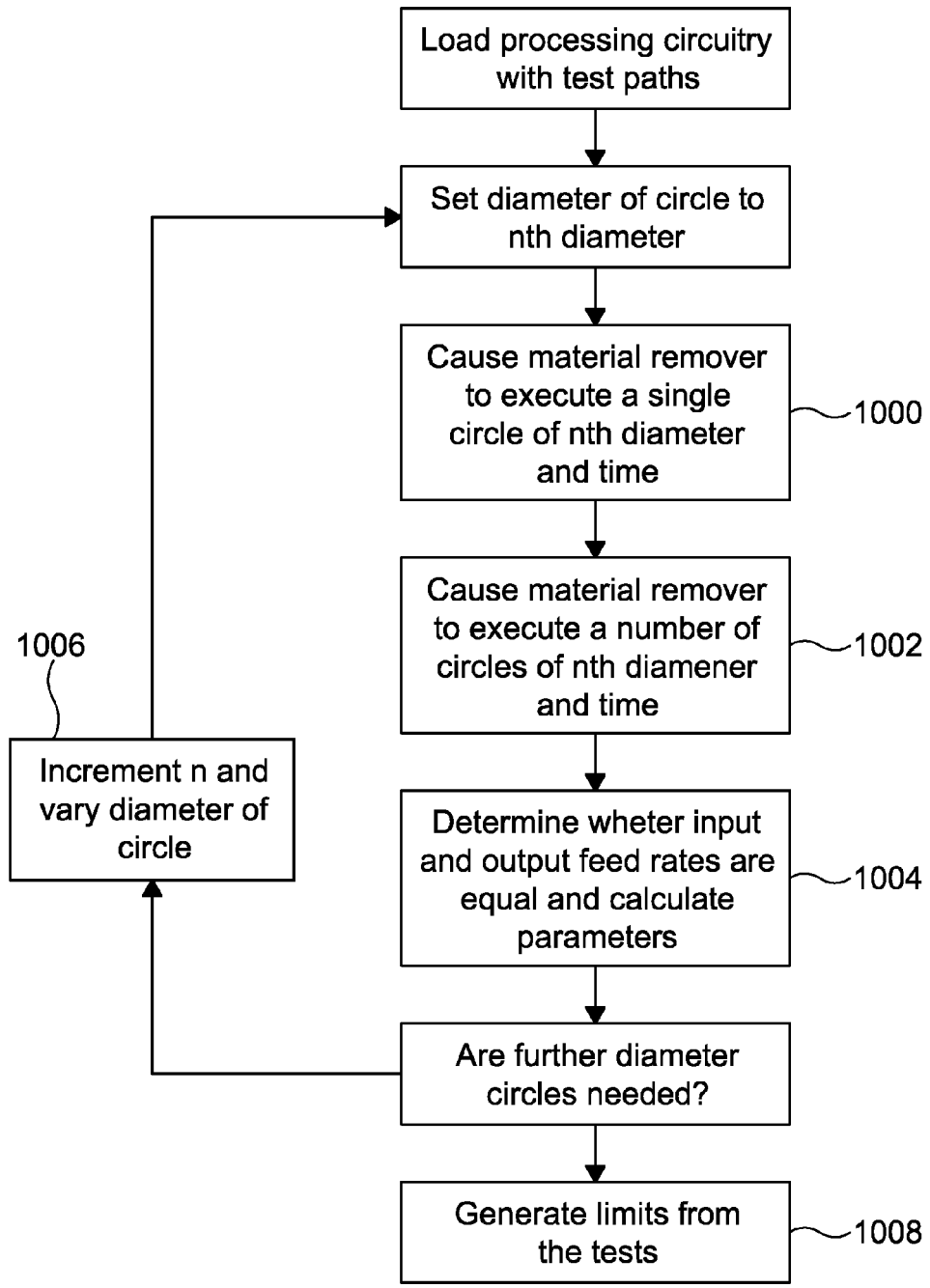
FIG. 10 shows a flow chart outlining the steps of an embodiment.

In one particular embodiment, the test run by the machine tool 200 comprises running the test using different sets of radius circles (and it can be seen with reference to the loop 1006 of FIG. 10 that the test are repeated with different radius circles).

In the embodiment being described the material remover is caused to execute a test path having an initial radius and the material remover 204 is timed as described above and a determination made as to whether the input and output feed rates match one another. This method is repeated, and in subsequent repetitions the value of the radius is reduced, until one of the following occurs: the radius of the circle of the test path is below a predetermined threshold (eg a radius threshold); until the limit for jerk is determine; or until the operator aborts the test (perhaps because the machine tool starts to behave erratically, etc.). Typically this predetermined radius threshold is less than 1 mm and may for example be 0.5 mm.

Subsequent iterations of the test reduce the radius by half until any of the end points, as discussed in the preceding paragraph, occur. The skilled person will appreciate that in other embodiments other strategies for reducing the radius of the circle may be used. For example, the radius of the circle may be reduced by other than 50% in each iteration.

In making the test paths described above, then the machine tool 200 may be instructed to cause the material remover 204 to move at its maximum feed rate. In other embodiments, the feed rate may be set to below maximum However, it is convenient to set the input feed rate close to the feed rate at which the machine tool will fail to be able to provide sufficient acceleration to the material remover. Such embodiments are advantageous in that they can help to reduce the time taken for the tests to be performed. Accordingly, once a fixed feed rate has been selected that the machine tool can achieve, it is then the radius of the circle of the test path that is then being used to test the limits of the machine.

The skilled person will appreciate that the machine tool can often be instructed to move along a natural arc; ie the processing circuitry is instructed to follow a curve defined by various parameters. The machine tool could also be instructed to follow a similar path by providing a series of points (as shown in FIG. 4) which approximate to that natural arc.

Figure 7A:
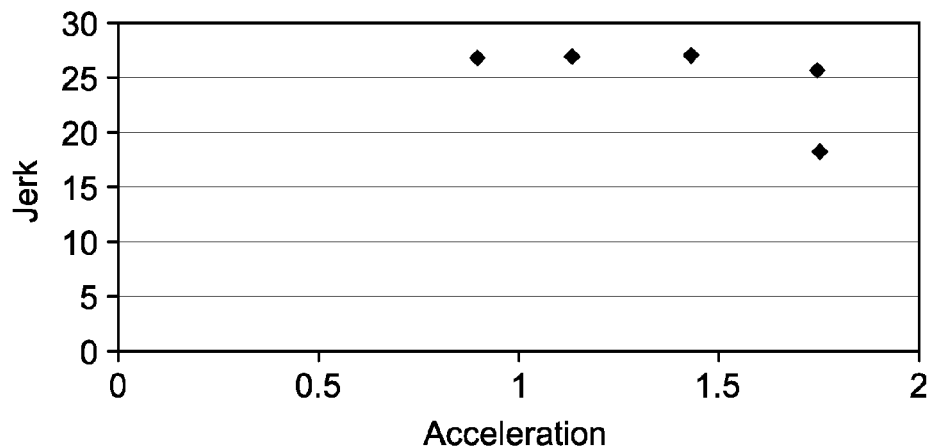
FIGS. 7a and 7b show plot of maximum acceleration of a material remover vs. maximum jerk of that material remover.

For each circular cutting path 500-504 that is analysed it possible to determine the maximum acceleration (from the radius of the circle and the maximum feed rate achieved) and also maximum jerk (ie change in acceleration) that the machine tool 200 can achieve. These points can be plotted on a graph as illustrated in FIG. 7a and b.

Before discussing FIG. 7, it is noted that the magnitude of the acceleration, a, for motion around a circle is given by the equation:

$$a = \frac{v^2}{r} \quad (1)$$

where v is the velocity magnitude and r the circle radius. The acceleration vector points towards the centre of the circle, and as such, is constantly changing. The rate of change of acceleration is also called jerk. The magnitude of the jerk vector is given by $$j = \frac{v^3}{r^2} \quad (2)$$

Elimination v from these equations gives:

$$j = \sqrt{\frac{a^3}{r}} \quad (3)$$

When calculating cutting paths from the limits that have been determined from the testing then one parameter that is useful to use is the minimum radius of curvature of which the machine tool is capable. Both the limit for acceleration and the limit for jerk that have been determined can be used to determine an associated minimum radius. If an acceleration limit gives a radius $r_a$ then radii below that value will have a larger acceleration, and radii above that value with have a smaller acceleration. Likewise if the jerk limit gives a radius $r_j$ then radii below that value will have a larger jerk, and radii above that value will have a smaller jerk.

So the smallest radius that the machine can move in is maximum of the two radii calculated in the formulae above, ie $$\max\left(\sqrt{\frac{v^3}{j}}, \frac{v^2}{a}\right) \quad (4)$$

Some embodiments thus use equation (4) in making a determination as to the minimum radius of curvature that can be used a cutting path for the particular machine tool.

This shows that for a fixed acceleration, decreasing the circle radius will increase the jerk.

FIG. 7a shows the results of a test run on one embodiment in which the following test results were obtained:

| radius | time | acceleration | jerk |
|--------|------|--------------|------|
| 0.016  | 0.6006 | 1.751092402 | 18.31908 |
| 0.008  | 0.4254 | 1.74523837  | 25.77728 |
| 0.004  | 0.3324 | 1.429215435 | 27.01572 |

-continued

| radius | time | acceleration | jerk |
|---|---|---|---|
| 0.002 | 0.264 | 1.132874702 | 26.96235 |
| 0.001 | 0.21 | 0.895202213 | 26.78439 |

The first column shows the radius of the circle of the circle used to perform a test in metres and the second column shows the time determined from the test for the material remover to execute a circle of that radius. The third and fourth columns show the derived acceleration and jerk. If these results are plotted then the graph of FIG. 7a is obtained and it can be seen that there is an acceleration limit of 1.75 m/s² and a jerk limit of 27 m/s³.

Thus, for each test path 500, 502, 504 that is executed the method determines the associated acceleration and jerk limits. As described above, it is perhaps likely that the acceleration limit is reached before the jerk limit. However, whichever is achieved first, once the limits for both acceleration and jerk have been obtained embodiments are likely not to run further circular cutting paths with a reduce radius.

In testing another machine, the following results were obtained:

| radius | time | acceleration | jerk |
|---|---|---|---|
| 0.02 | 0.517647 | 2.946607099 | 35.76583 |
| 0.01 | 0.364 | 2.979593165 | 51.43224 |
| 0.005 | 0.258824 | 2.946607099 | 71.53167 |
| 0.0025 | 0.178431 | 3.099968729 | 109.1606 |

Figure 7B:
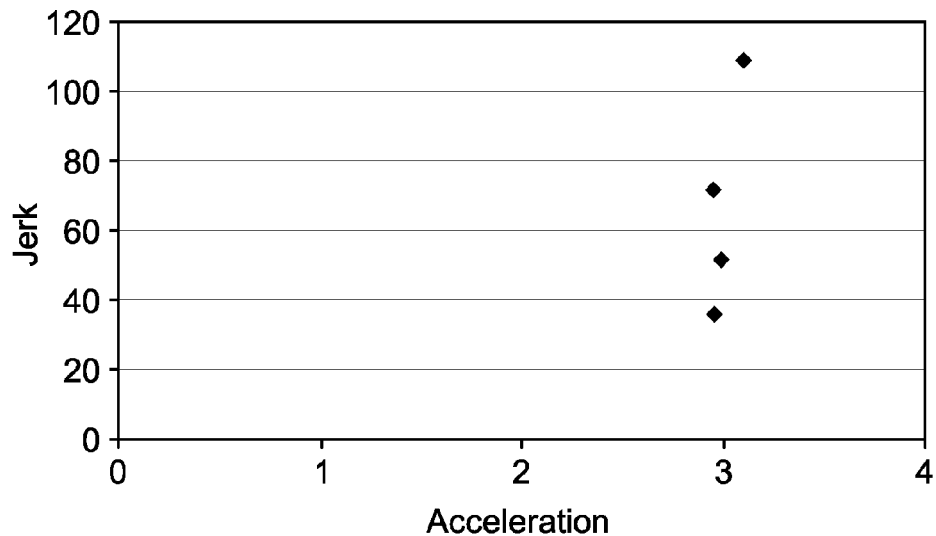

These results are plotted on FIG. 7b and it can be seen that the tests carried out have highlighted a maximum acceleration that the machine can apply of 3 m/s² but that the maximum jerk has not been determined from the test but that the maximum jerk is above 110 m/s³. Typically, such a result is obtained when the reduction in radius of the test path described in relation to FIG. 5 is stopped when the test of the predetermined minimum radius (ie the predetermined threshold) has been executed. Embodiments may set an upper jerk limit in such instances. Some embodiments may allow an operator to set the upper jerk limit in order to help the machine tool perform as desired.

As discussed above, the test paths are typically performed at a constant feed rate. Therefore, equation (3) above can be used to determine the minimum cutting radius; ie parameter 1 in the list of five parameters listed above.

Figure 8:
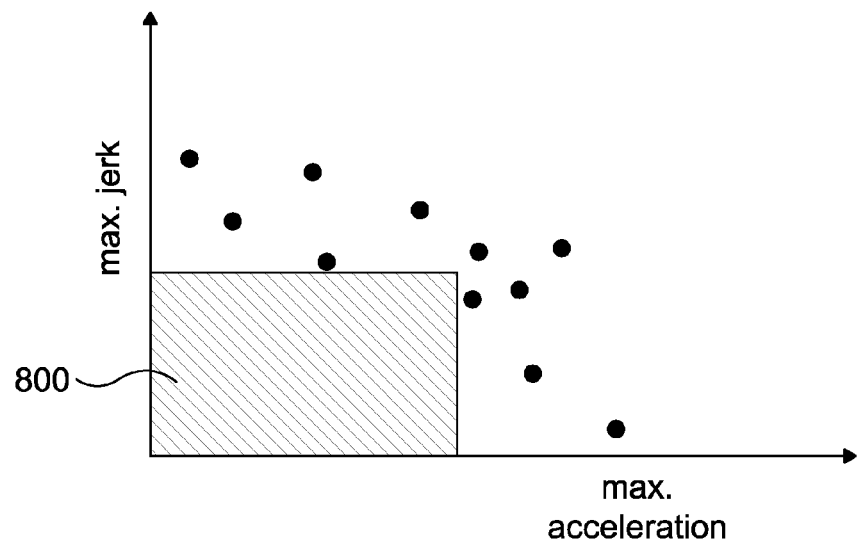
FIG. 8 shows a further plot of maximum acceleration of a material remover vs. maximum jerk of that material remover.
Figure 9:
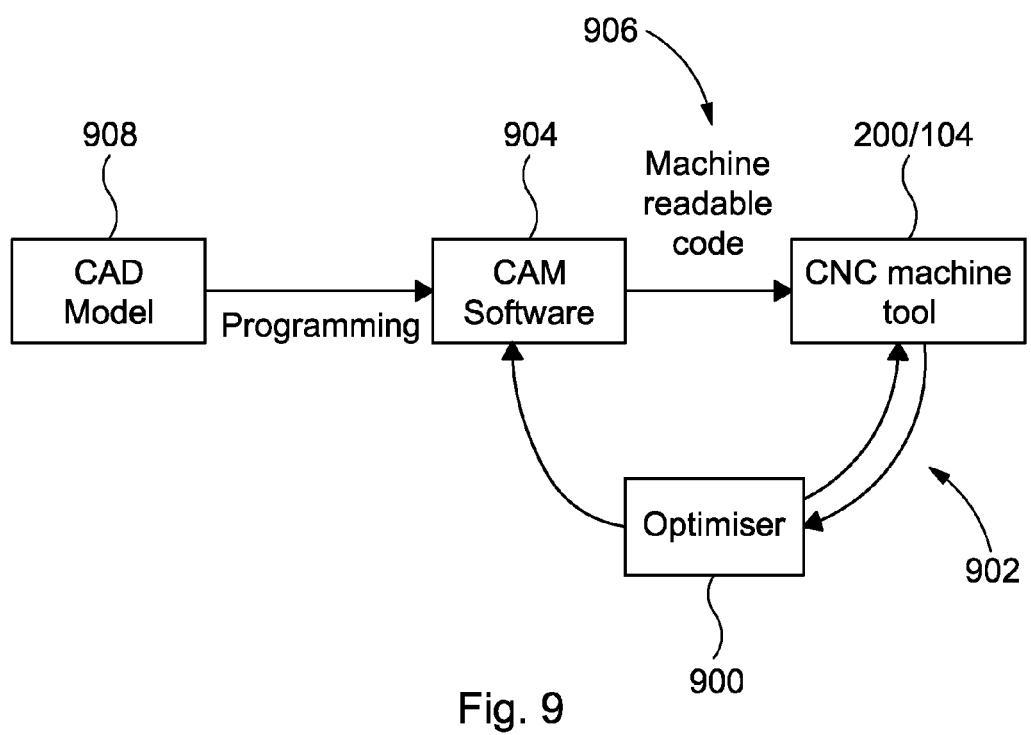
FIG. 9 illustrates a high level process of an embodiment.

However, in some cases, the results may be similar to those shown in FIG. 8 where a plot of maximum acceleration vs. maximum jerk gives a seemingly random arrangement of points. As such, embodiments may be arranged to fit a rectangle 800 of the largest possible area within the points. Such a rectangle then gives an envelope giving useable acceleration and jerk limits.

Above, it is described that in some embodiments the test may cause the material remover to perform a test path comprising eleven revolutions of a circle. Such an embodiment may be appropriate for machine tools 200 that are able to time movement of the material remover to a high precision and allow the machine tool timings to be obtained from an average of more than one test path. Here, high precision, may be interpreted to mean to an accuracy of less than 1 s. For example, the machine tool may be able to time the movement of the material remover to an accuracy of substantially 0.1 s; 0.01 s, or 0.001 s.

In other embodiments, the machine tool may be able to time the movement of the material remover to an accuracy of greater than 1 s. In such embodiments, the test may need to cause the material remover to execute more test paths in order to provide an accurate timing. In such embodiments, the processing circuitry of the machine tool may be caused to make the material remover perform a circular test path for a predetermined time and to count the number of circles executed in that time. For example the processing circuitry may be arranged to cause the material remover to run for substantially 100 s. In other embodiments, the time may be substantially 50 s, 60 s, 70 s, 80 s, 90 s, 110 s, 120 s, 150 s, 180 s, or the like. The skilled person will appreciate that there is a trade off between the accuracy of the calculations and the time taken to run the test; if the test takes too long to perform then operators may be unwilling to perform the tests.

Thus, once the tests described above have been performed a series of limits (such as those outlined in points 1 to 4 above) can be determined (step 1008)

Thus, in broad terms, some embodiments may be thought of as providing an optimiser 900 that interacts 902 with the machine tool 200/processing circuitry thereof 104.

Parameters (ie a series of limits) that are determined by the optimiser 900 may then be used by software 904 that generates machine readable code 906 to ensure that that machine readable code does not exceed the physical or processing constraints of the particular machine tool 200 that is to be driven by the machine readable code 906. It will be appreciated that the input to the software used to generate the machine readable code 906 is often a CAD model 908.

Thus, in some embodiments a user of the system may set parameters such as feed rate (F); spindle speed (N); step over (s); step down/cutting depth (d) according to the material 202 being machined and/or the material remover 204. The optimiser 900 may however be arranged to determine, by running tests as exemplified in the above embodiments, other parameters such as the minimum arc radius and point spacing (described in relation to FIG. 4).

Figure 11:
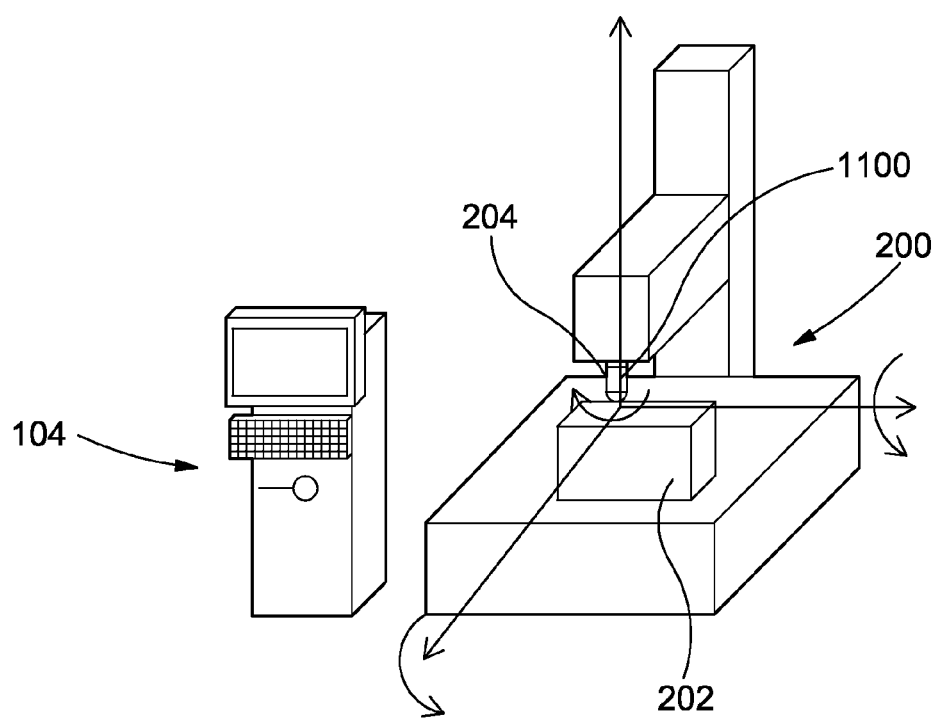
FIG. 11 shows a machine tool on which a data capture device has been fitted.

FIG. 11 shows a machine tool, similar to that shown in FIG. 2 (and like parts are referenced with the same reference numerals), on which a data capture device 1100 has been fitted adjacent the material remover 204. There is now described in relation to FIGS. 11 to 17 embodiments which cause the material remover 204 to execute movements (ie be moved along test paths) that cause known patterns to be generated within timing data captured by the data capture device 1100.

In one embodiment, the data capture device comprises a mechanism to capture the acceleration and/or the change in acceleration of the material remover 204 as the material is moved, perhaps to execute a test path. Typically, the mechanism will be at least one, and possible more than one, of an accelerometer; a gyroscope; a compass.

The data capture device may comprise a memory in which to store timing-data where the memory may be any of the formats described herein. In other embodiments, the data capture device may be arranged to transmit data, wirelessly or by wire, to a remote processing device or memory. Conceivably, the data capture device may be arranged to transmit timing data to the processing circuitry 104.

It will be appreciated that as the material remover 204 is moved along a test path, then the material remover 204 will undergo acceleration and changes of acceleration. Hereinafter, the phrase acceleration is intended, if the context allows, to cover both acceleration and change in acceleration (ie jerk). Thus, by moving the material remover 204 along a predetermined path know accelerations are caused on the material remover 204 which known accelerations can be observed within the timing data.

Figures 12A, 12B:
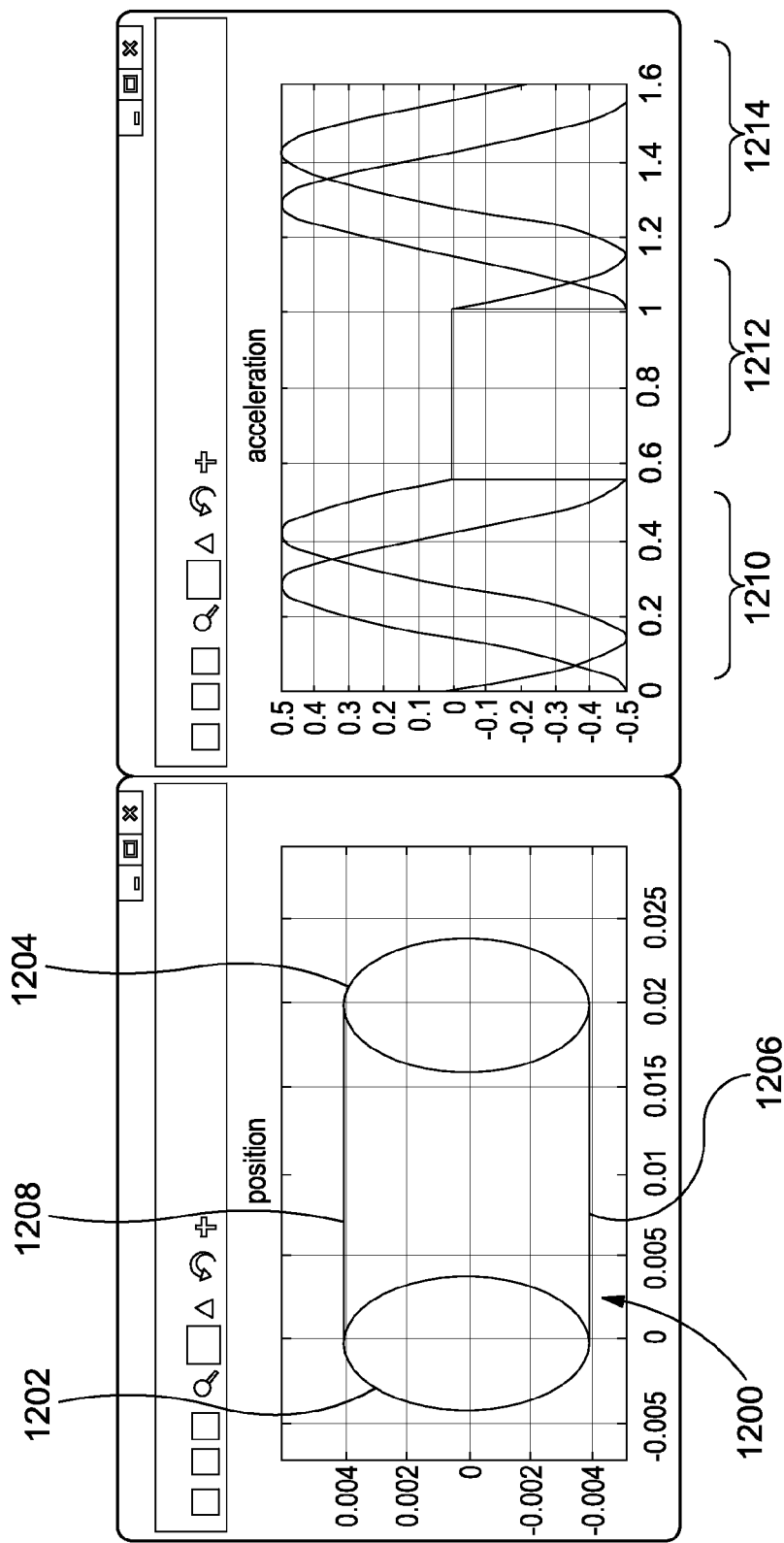

For example, FIG. 12a shows a test path 1200 comprising a first circle 1202, a second circle 1204 linked by two straight line segments 1206, 1208. In other embodiments, the circles may be ellipses, or other curved closed shapes, but it will be appreciated that embodiments using a circle may be convenient due to the constant radius and therefore constant acceleration in two directions (assuming constant velocity around the path).

FIG. 12b shows the accelerations that would be experienced, in two orthogonal directions, as the material remover 204 were made to move around the test path 1200. It will be seen that as the material remover 204 moves around the first circle 1202 a sinusoidal acceleration 1210 is experienced in each of the directions but with a 180° shift. As the material remover 204 moves onto the straight line segment 1206, or 1208, there is a zero acceleration in region 1212 followed by a further sinusoidal portion 1214 as the material remover moves around the second circle 1204. It will be noted that there are some abrupt accelerations as the material remover is caused to change path from circular to straight. In some embodiments, the material remover may be caused to make multiple rotations of at least one of the circles 1202, 1204 which result in multiple cycles of the sinusoidal wave.

Figure 13:
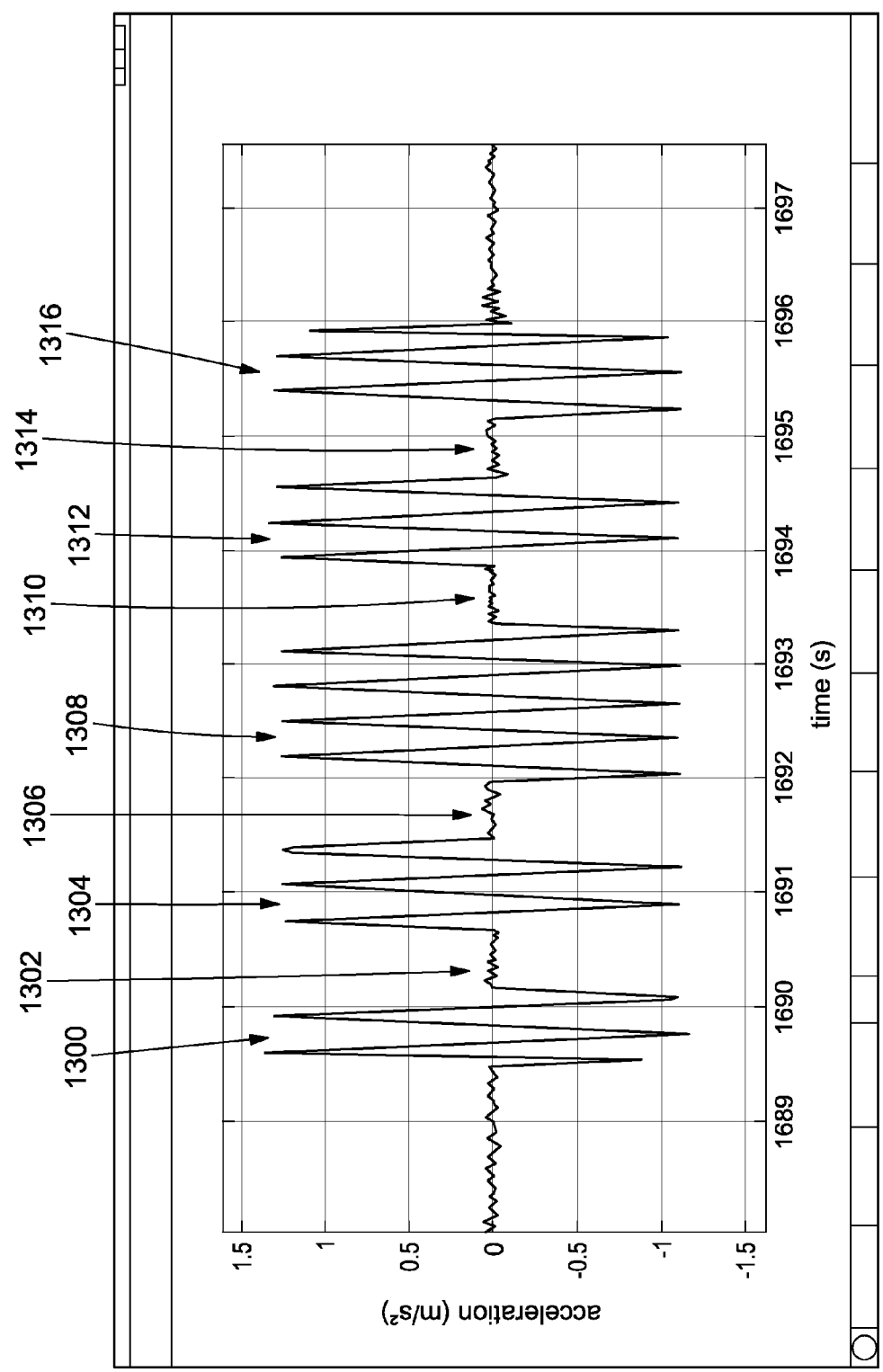

FIG. 13 shows some example timing-data that has been captured from a data capture device 1100 as it is caused to execute the test path of FIG. 12a. In this, it will be seen that the there are multiple periods of sine wave followed by flat portions as exemplified in FIG. 12. For clarity timing data for only one of the axis is shown in FIG. 13. Thus FIG. 13 shows a test path in which the material remover has been made to make 2.5 revolutions of a circle—eg 1202 (1300), move along the straight portion 1208 (1302); make 2.5 revolutions of the other circle eg 1204 (1304); move along the straight portion 1206 (1306); make 4.5 revolutions of the circle 1202 (1308); move along the straight portion 1208 (1310); move 2.5 times around the circle 1204 (1312); move along the straight portion 1206 (1314) and finally to move 2.5× around the circle 1204 (1316).

The exact path that the material remover is arranged to follow may, in some embodiments, be used to encode data into the timing data. Such encoding may be able to identify the test paths that are to follow.

Features are typically detected within the timing data by using zero-crossing detection. Other embodiments, could potentially use peak detection, etc. In particular, some embodiments may limit the zero crossing detection to those between two opposite peaks (eg a maximum and a minimum) in order to ensure that noise does not trigger a zero crossing.

Figures 14A, 14B:
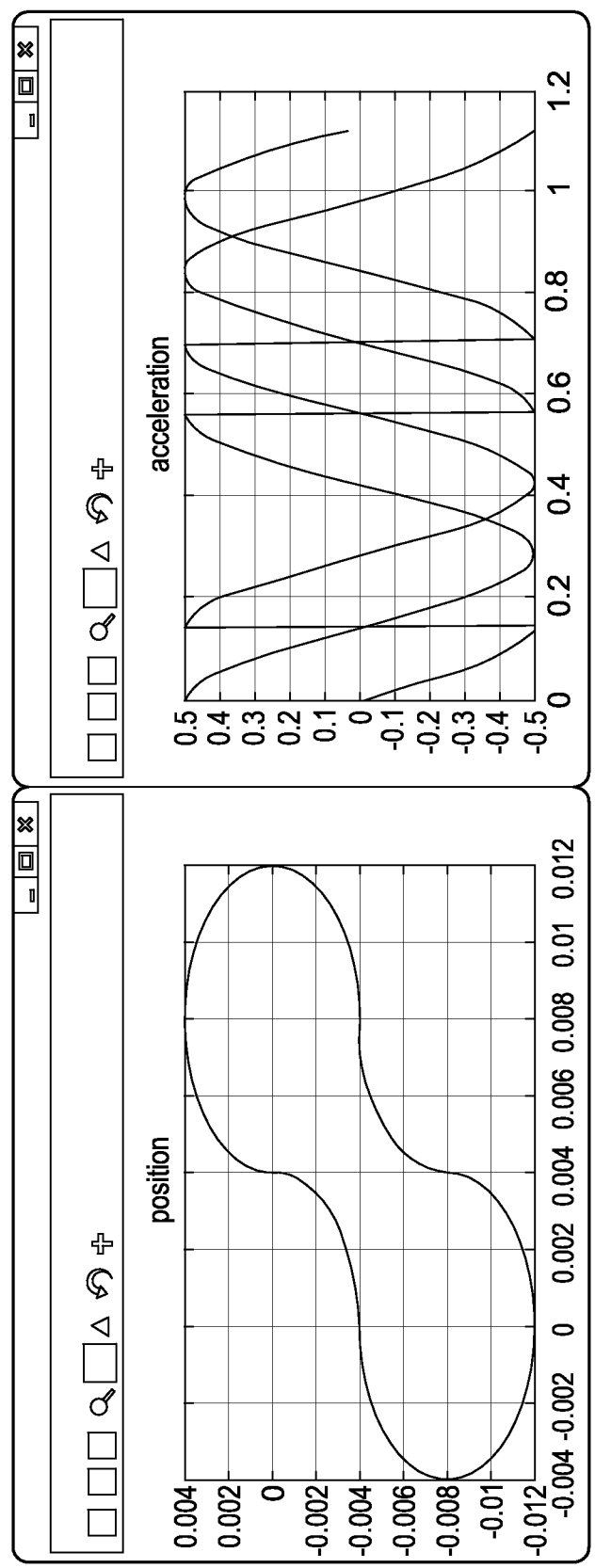

FIG. 14a show a further test path that some embodiments use to generate known patterns within the timing data. There may of course be other test paths other than those shown in FIGS. 12a and 14a. FIG. 14b shows the acceleration, in two orthogonal axes, as the material remover 204 is moved around the test path shown in FIG. 14a.

Figure 15:
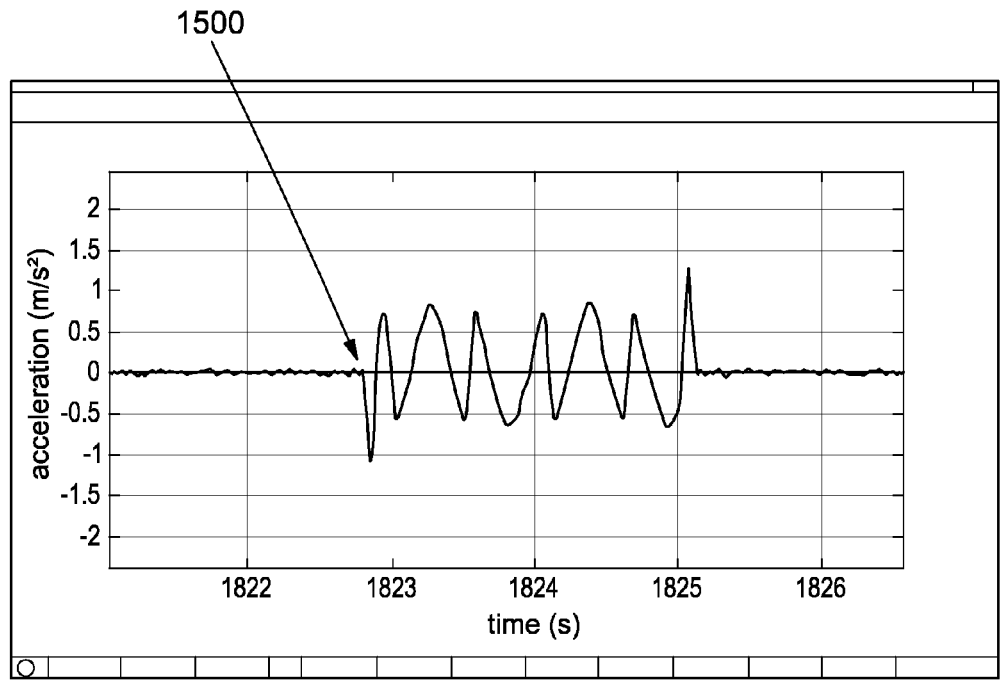

FIG. 15 shows example timing data 1500 collected from a data capture device executing the path of FIG. 14a. In this path the zero-crossing points of the acceleration have different length spacings and form a short, short, short, long, short, short, long, etc. pattern. This pattern can be detected within the timing data 1500.

Thus, some embodiments may combine different test paths, into large test paths, in order to cause known patterns within the timing data collected by the data capture device 1100.

Figure 16:
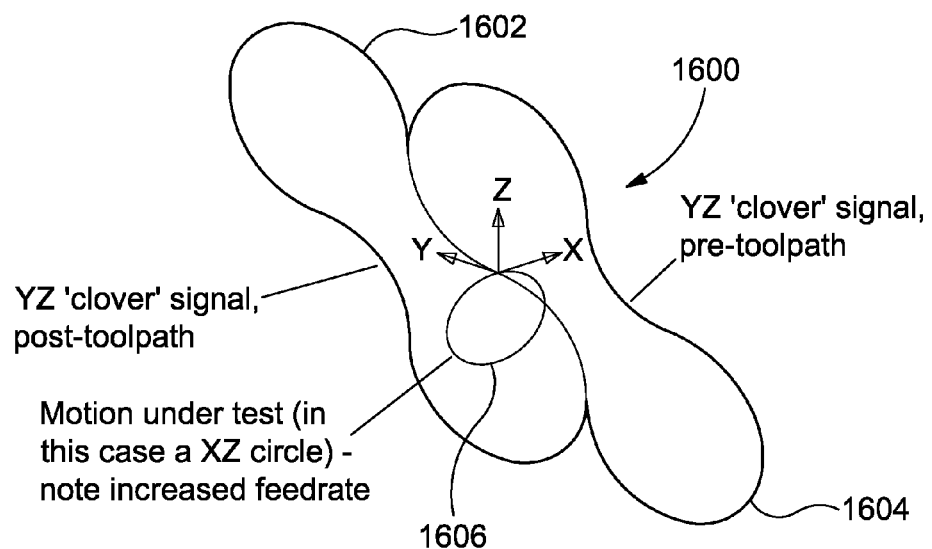
FIG. 16 shows a combination of test paths.

FIG. 16 shows an example of a test path 1600 which is comprised of two test paths as shown in FIG. 14a (1602, 1604) in-between which there is a circular test path 1606. The circular test path 1606 may be used as described in relation to any of the above figures. Because test paths may be used to created known, and perhaps distinctive, patterns within the data they may be used to provide stop and/or start information that test data is about to be provided.

Thus, in an embodiment performing the test path as shown in FIG. 16 the material remover 204 may be caused to perform the test path 1602 to signify the data is about to start, perform a plurality of circular paths 1606 as described above and finally to perform the path 1604 to signify the test has finished. Thus, the test path 1602 is used to signify the start of the circular path 1606, the circular path 1606 can be used to determine the machine tool timings as described above, and the test path 1604 can be used to signify the finish of the circular path 1606.

The whole path as shown in FIG. 16 may be performed a number of times. In each instance an embodiment may vary the number of times that the circular path is performed.

The timing data may be analysed off-line and patterns within the test data may be used to determine any one or more of the following: what test paths the material remover was asked to follow; the start point of the test path used to determine the machine tool timings; the stop point of the test path used to determine the machine tool timings.

Figure 17:
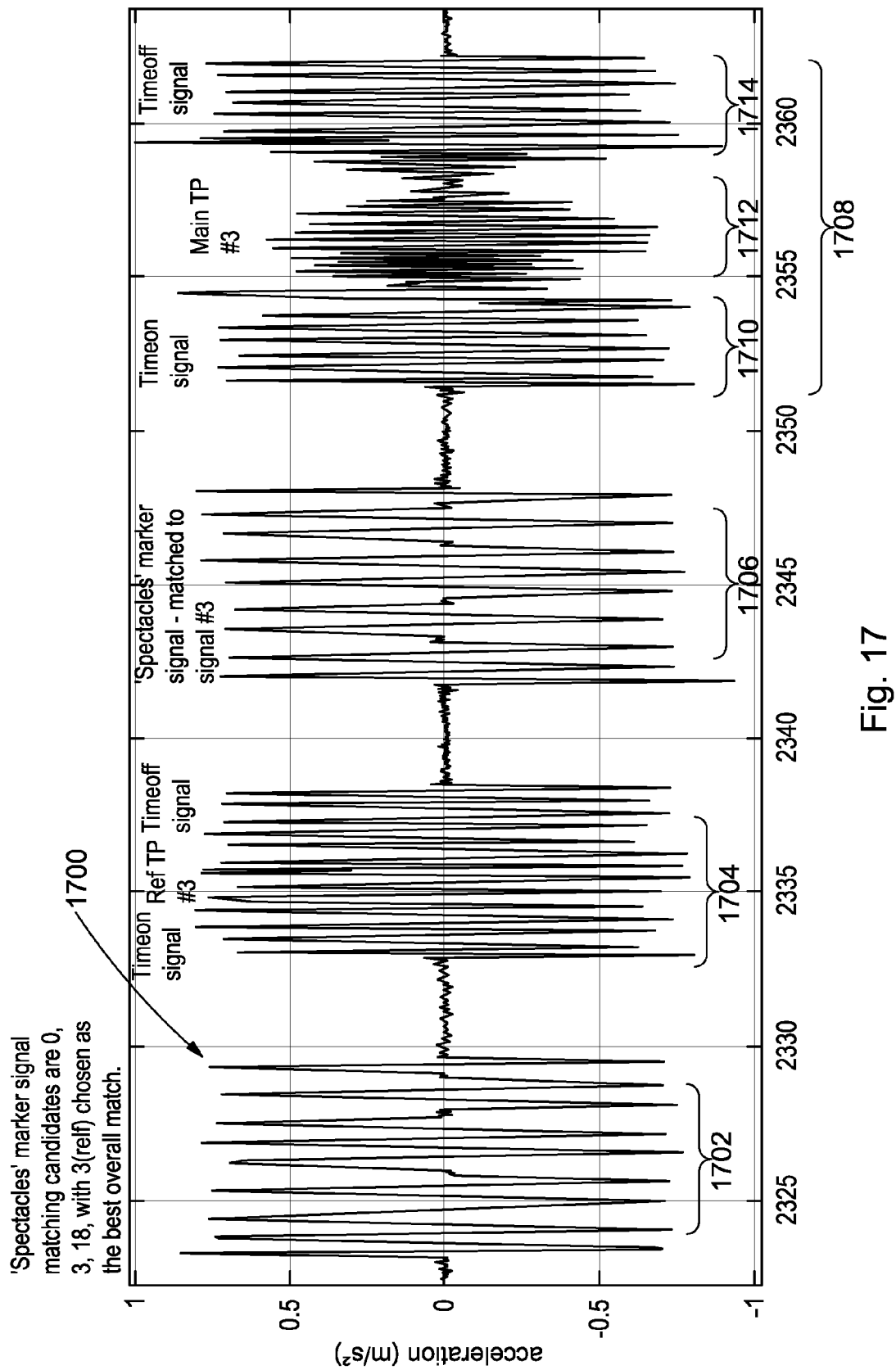
FIG. 17 shows example timing data collected from a data capture device.

FIG. 17 shows example timing data captured from a data-capture device. Thus, in this embodiment, it can be seen that the timing data 1700 has distinct regions which are now described.

The first region 1702 is generated by causing the material remover 204 to execute the path of FIG. 12a. The crossings, number of sine wave and the like is used to encode information as to what follows. Thus, the region 1702 may be thought of as a data encoding block as it provides data on the timing data that follows.

Next, follows region 1704 occurs and comprises a single loop of the path shown in FIG. 14a, a single circle, followed by a single loop of the path shown in FIG. 14a. Accordingly, in region 1704 a start signal, a single test loop and a stop signal is provided within this region of the timing data. Thus, the test path as shown in FIG. 14a may be thought of as being a start pattern and a stop pattern. In these embodiments that start and stop patterns are the same but this need not be the case.

Next follows region 1706 which again is generated by causing the material remover 204 to execute the path of FIG. 12a.

Lastly, there is the region 1708 which can be seen to constituted by three sub regions. Firstly there is sub-region 1710 which is generated by the material remover moving around the test path of FIG. 14a and provides a start signal. Sub-region 1712 is generated by causing the material remover to move around a circular path a plurality of times. Finally there is sub-region 1714 which is generated by causing the material remover 204 to move around the test path shown in FIG. 14a-thereby providing a stop signal.

Thus, it will be seen that in this embodiment, the timing data provides markers (provided by the test path of FIG. 14a) which signify the start and stop of tests. The timing data also provides the time it takes the machine tool to execute a single circular test path (from region 1706) and the time that it takes the material remover 204 to execute multiple circular paths (from sub-region 1712). Thus, the timing data for the circular paths can be processed as described above to generate machine tool timings.

The circular test path performed in region 1706 may be thought of as a first part of a test. The plurality of circular test paths performed in sub-region 1712 may be thought of as a second part of a test. As described above, the overall test (eg the whole test path as represented in the timing data shown in FIG. 17) may be performed a plurality of times. In each instance, a parameter of the test paths, such as the radius of the circle, etc. in region 1706/sub-region 1712, or any other parameter may be varied. The radius or other parameter may be encoded within the timing data and for example might be encoded within the test pattern as illustrated in FIG. 12*a*.

Reference is made herein to the radius in relation to test paths. The skilled person will appreciate that in many instances the use of radius could be replaced by diameter and the document should be interpreted accordingly.

The invention claimed is:

1. A method of testing a machine tool comprising processing circuitry arranged to control a material remover, in which the method comprises:
  a) generating a test path to be processed by the processing circuitry to cause the material remover of the machine tool to move along a predetermined path, wherein the test path comprises at least one closed test path having a set shape and set size;
  b) causing the processing circuitry to execute the test path and move the material remover along the test path;
  c) in a first portion of the test path execution, causing the material remover to execute the at least one closed test path having the set shape and set size a single time, and in a second portion of the test path execution, occurring after the first portion of the test path execution, causing the material remover to execute a plurality of times the at least one closed test path having the set shape and set size that was executed in the first portion, wherein the material remover executes the second portion of the test path execution from a moving start;
  d) while the processing circuit is executing the test path, obtaining machine tool timings using the movement of the material remover along the test path, including determining an average time for executing the closed test path at a constant feed rate, wherein determining the average time comprises determining a total time required to complete both the first portion and the second portion, subtracting the time required to complete the first portion from the total time, and dividing the result of the subtracting by the number of times that the closed test path is executed in the second portion to obtain the average time; and
  e) setting machine tool parameters for the machine tool based on the machine tool timings from the test path to be subsequently used when cutting paths are generated for the machine tool, wherein the machine tool parameters comprise a minimum radius that the machine tool can be moved around.

2. The method of claim 1 in which material remover is caused to execute the test path with no work-piece present.

3. The method of claim 1, wherein the material remover, in the first portion, executes the at least one closed test path with a parameter of a first value and, in the second portion, executes the at least one closed test path with the parameter set at that first value.

4. The method of claim 1 in which the material remover is caused to perform the first and second portions with a parameter of the test path being different between executions.

5. The method of claim 4 in which the parameter is the radius of at least a portion of the closed test path.

6. The method of claim 5 in which:
  a. the material remover is caused to execute the closed test path with a parameter of a first value and timed for that execution;
  b. subsequently a value of the parameter of the closed test path is altered and the material remover is timed to execute the closed test path with the altered value of the parameter; and
  c. step b is repeated until the material remover does not execute the closed test path correctly or until the altered value of the parameter is altered beyond a predetermined value.

7. The method of claim 6 in which the closed test path is circular and the parameter being varied is the diameter or radius of the path.

8. The method of claim 6 in which the closed test path is circular and the parameter that is varied is the diameter or radius of the path and wherein the diameter or radius of the circle is halved in each iteration of step b.

9. The method of claim 1 in which a determination is made of the processing performance of the processing circuitry by determining the maximum rate at which the processing circuitry of the machine tool can process points defining the test path.

10. The method of claim 1 in which the processing circuitry of the machine tool is used to time the movement of the material remover.

11. The method of claim 1 in which a data capture device that is separate from the material remover is used to capture timing-data, which timing data is subsequently used to time the movement of the material remover.

12. The method of claim 11 in which the machine tool is caused to execute movements that cause known patterns within the timing data in order to allow the machine tool timings to be determined from the timing data.

13. The method of claim 12 in which the known patterns comprise any from the set: a data encoding block; a stop pattern; and a start pattern.

14. The method of claim 11 in which the timing data is collected and processed off-line.

15. The method of claim 1, further comprising querying processing circuitry of the machine tool, wherein the limits are set based on a combination of querying and using the machine tool timings.

16. A machine tool comprising a processing circuitry which is arranged to be programmed and a material remover arranged to be controlled by the processing circuitry, wherein the processing circuitry is arranged to perform the following:
  a) receive a test path arranged to cause the material remover of the machine tool to move along a predetermined path, wherein the test path comprises at least one closed test path having a set shape and set size;
  b) execute the test path and move the material remover along the test path, wherein executing the test path includes a first portion where the material remover executes the at least one closed test path having the set shape and set size a single time and a second portion, occurring after the first portion, where the material remover executes a plurality of times the at least one closed test path having the set shape and set size that was executed in the first portion, wherein the material remover executes the second portion of the test path execution from a moving start;
c) while executing the test path, timing at least one of the performance of the processing circuitry and the movement of the material remover along the test path to generate machine tool timings, including determining an average time for executing the closed test path at a constant feed rate, wherein determining the average time comprises determining a total time required to complete both the first portion and the second portion, subtracting the time required to complete the first portion from the total time, and dividing the result of the subtracting by the number of times that the closed test path is executed in the second portion to obtain the average time; and
d) set machine tool parameters for the machine tool based on the machine tool timings from the test path to be subsequently used when cutting paths are generated for the machine tool, wherein the machine tool parameters comprise a minimum radius that the machine tool can be moved around.

17. A non-transitory machine readable medium containing instructions to cause a processing circuitry to generate a test path for a material remover arranged to be controlled by a further processing circuitry of a machine tool, wherein the processing circuitry is arranged to:
a) generate a test path arranged to cause the material remover of the machine tool to move along a predetermined path, wherein the test path comprises at least one closed test path having a set shape and set size;
b) cause the processing circuitry to move a material remover along the test path;
c) in a first portion of moving the material remover along the test path, cause the material remover to execute the at least one closed test path having the set shape and set size a single time, and in a second portion of moving the material remover along the test path occurring after the first portion, cause the material remover to execute a plurality of times the at least one closed test path having the set shape and set size that was executed in the first portion, wherein the material remover executes the second portion of the test path execution from a moving start;
d) while the material remover is moving along the test path, obtain machine tool timings using the movement of the material remover along the test path, including determine an average time for executing the closed test path at a constant feed rate, wherein determining the average time comprises determining a total time required to complete both the first portion and the second portion, subtracting the time required to complete the first portion from the total time, and dividing the result of the subtracting by the number of times that the closed test path is executed in the second portion to obtain the average time; and
e) set machine tool parameters for the machine tool based on the machine tool timings from the test path to be subsequently used when cutting paths are generated for the machine tool, wherein the machine tool parameters comprise a minimum radius that the machine tool can be moved around.

18. A method of generating a cutting path for a material remover of a machine tool, the machine tool comprising processing circuitry arranged to control a material remover of the machine tool and the method comprising:
a) generating a test path to be processed by the processing circuitry to cause the material remover of the machine tool to move along a predetermined path, wherein the test path comprises at least one closed test path having a set shape and set size;
b) causing the processing circuitry to execute the test path and move the material remover along the test path;
c) in a first portion of the test path execution, causing the material remover to execute the at least one closed test path having the set shape and set size a single time, and in a second portion the test path execution, occurring after the first portion of the test path execution, causing the material remover to execute a plurality of times the at least one closed test path having the set shape and set size that was executed in the first portion, wherein the material remover executes the second portion of the test path execution from a moving start;
d) while the processing circuit is executing the test path, obtaining machine tool timings using the movement of the material remover along the test path, including determining an average time for executing the closed test path at a constant feed rate, wherein determining the average time comprises determining a total time required to complete both the first portion and the second portion, subtracting the time required to complete the first portion from the total time, and dividing the result of the subtracting by the number of times that the closed test path is executed in the second portion to obtain the average time;
e) setting machine tool parameters for the machine tool based on the machine tool timings from the test path to be subsequently used when cutting paths are generated for the machine tool, wherein the machine tool parameters comprise a minimum radius that the machine tool can be moved around; and
f) generating the cutting path using the limits from step e.

* * * * *